(12) United States Patent
Monestier et al.

(10) Patent No.: US 12,158,418 B2
(45) Date of Patent: Dec. 3, 2024

(54) GAS SENSORS USING NON-DISPERSIVE INFRARED MATERIALS

(71) Applicant: Lumileds LLC, San Jose, CA (US)

(72) Inventors: Florent Gregoire Monestier, Kerkrade (NL); Franklin Chiang, Campbell, CA (US); Hisashi Masui, Newark, CA (US)

(73) Assignee: Lumileds LLC, San Jose, CA (US)

( * ) Notice: Subject to any disclaimer, the term of this patent is extended or adjusted under 35 U.S.C. 154(b) by 267 days.

(21) Appl. No.: 18/070,121

(22) Filed: Nov. 28, 2022

(65) Prior Publication Data

US 2023/0168193 A1     Jun. 1, 2023

Related U.S. Application Data

(60) Provisional application No. 63/285,013, filed on Dec. 1, 2021.

(51) Int. Cl.
*G01N 21/3504* (2014.01)
(52) U.S. Cl.
CPC .  *G01N 21/3504* (2013.01); *G01N 2201/0636* (2013.01); *G01N 2201/068* (2013.01)
(58) Field of Classification Search
CPC ....... G01N 21/3504; G01N 2201/0636; G01N 2201/068; G01N 21/314; G01N 21/3151
See application file for complete search history.

(56) References Cited

U.S. PATENT DOCUMENTS

| | | | |
|---|---|---|---|
| 12,019,017 B2* | 6/2024 | Masui | G01N 33/0004 |
| 2023/0168190 A1* | 6/2023 | Masui | G01N 21/031 |
| | | | 250/340 |
| 2023/0168191 A1* | 6/2023 | Yue | G01N 21/3151 |
| | | | 250/339.06 |

OTHER PUBLICATIONS

"How does an NDIR CO2 Sensor Work?", [online]. Retrieved from the Internet: <URL: https://www.co2meter.com/blogs/news/how-does-an-ndir-co2-sensor-work, (Jan. 19, 2022), 9 pgs.

* cited by examiner

*Primary Examiner* — David P Porta
*Assistant Examiner* — Meenakshi S Sahu
(74) *Attorney, Agent, or Firm* — Schwegman, Lundberg & Woessner, P.A.

(57) ABSTRACT

A gas sensing system measures a concentration of a gas sample having an absorption peak at a first wavelength. An emitter emits light having a spectrum that includes at least the first wavelength. A sensor detects at least some of the light emitted by the emitter. A porous scattering material is substantially transparent at the first wavelength and scatters at least some of the light. A surface of the porous scattering material opposing the emitter and the sensor has a depression. The emitter and the sensor are laterally and vertically separated by a separator filling the depression. The separator specularly or diffusively reflects the light emitted by the emitter.

20 Claims, 12 Drawing Sheets

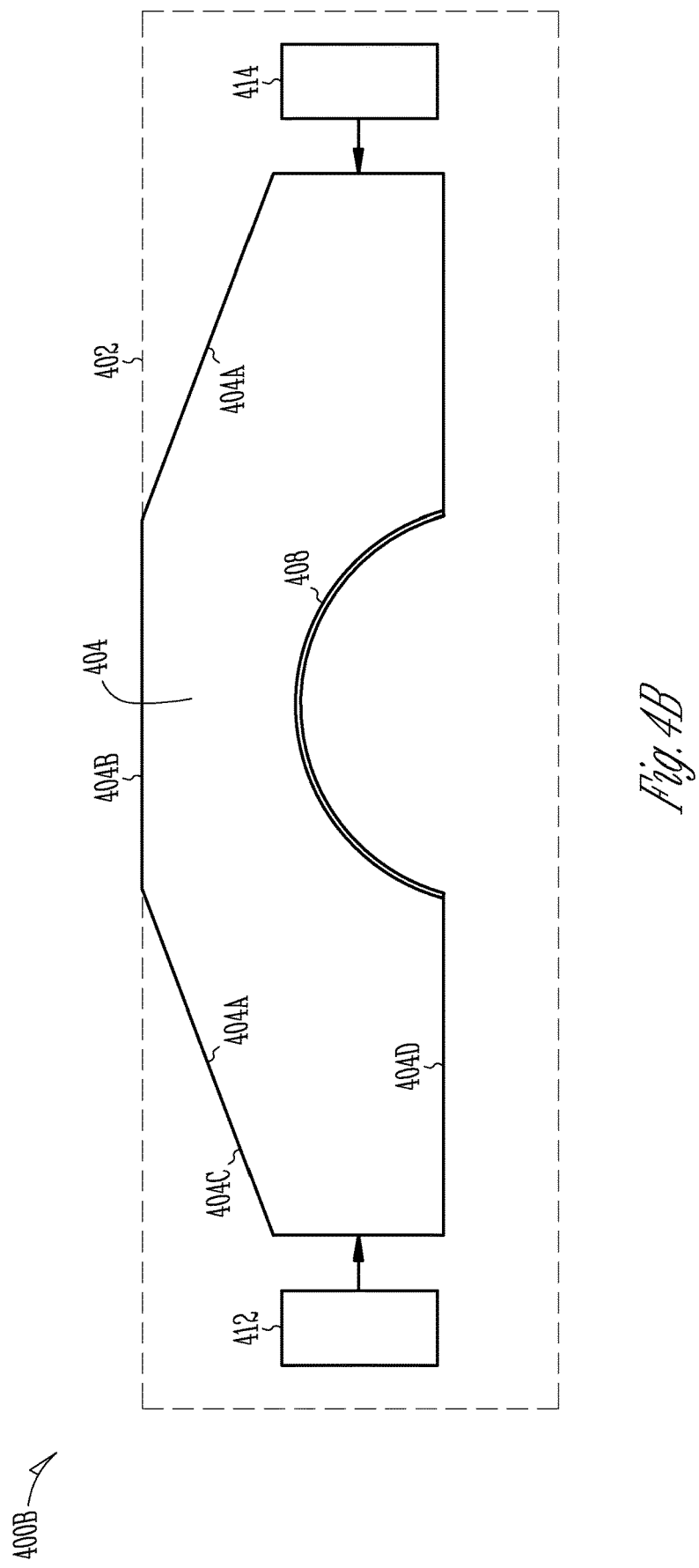

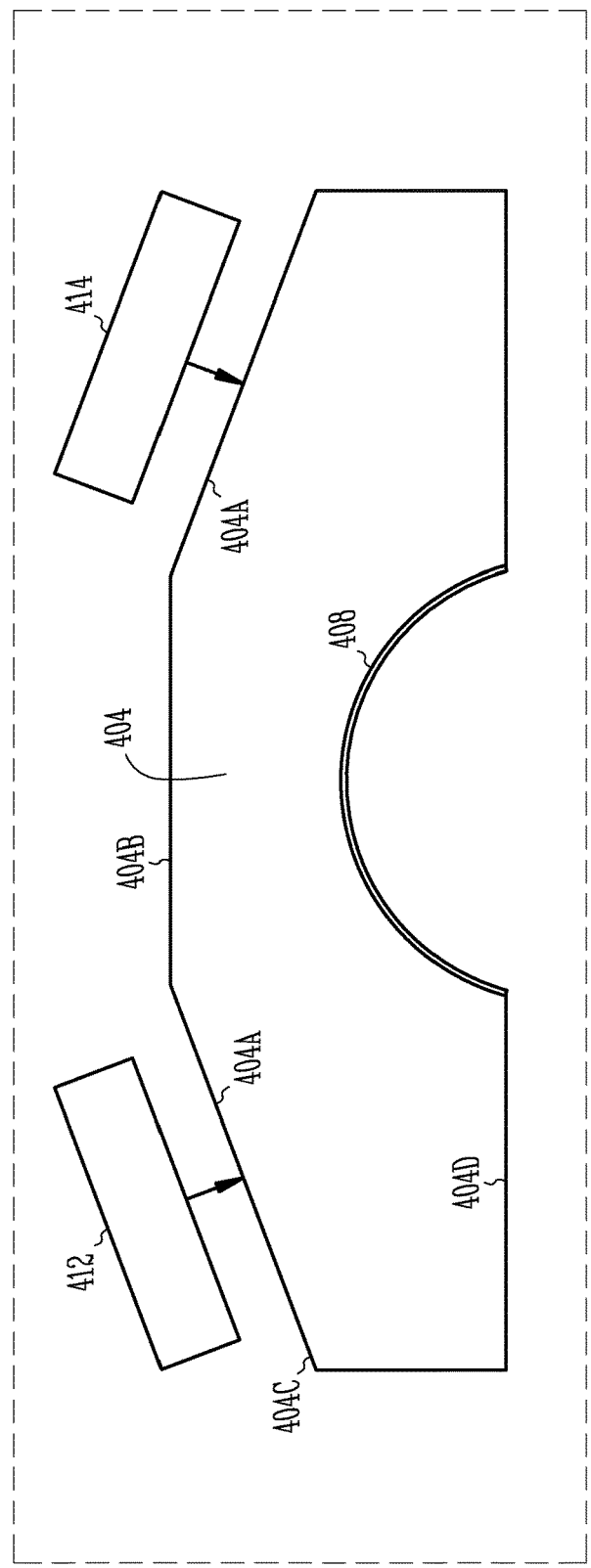

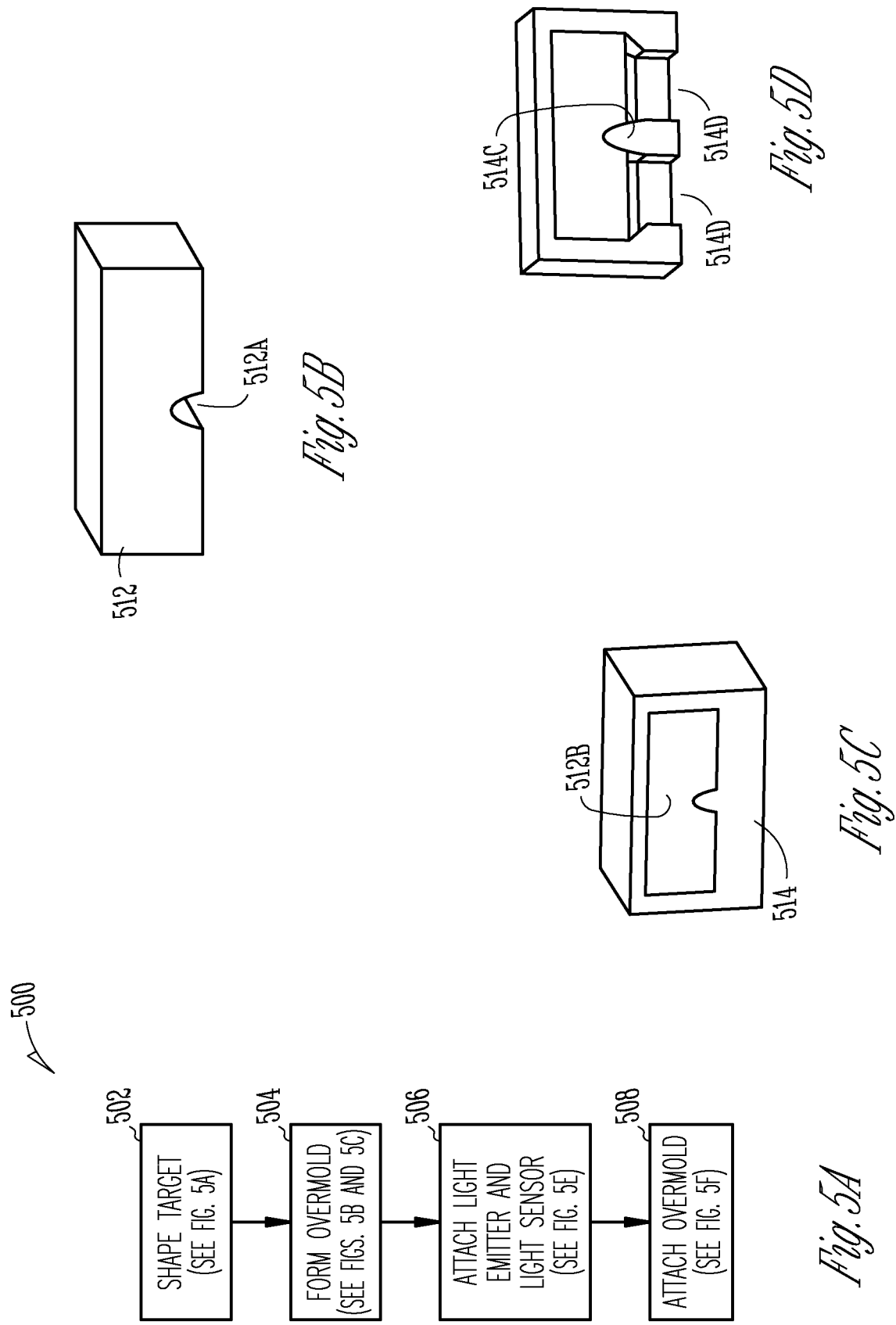

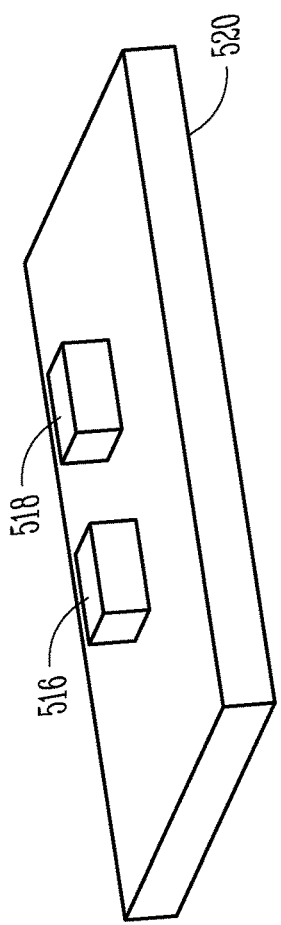
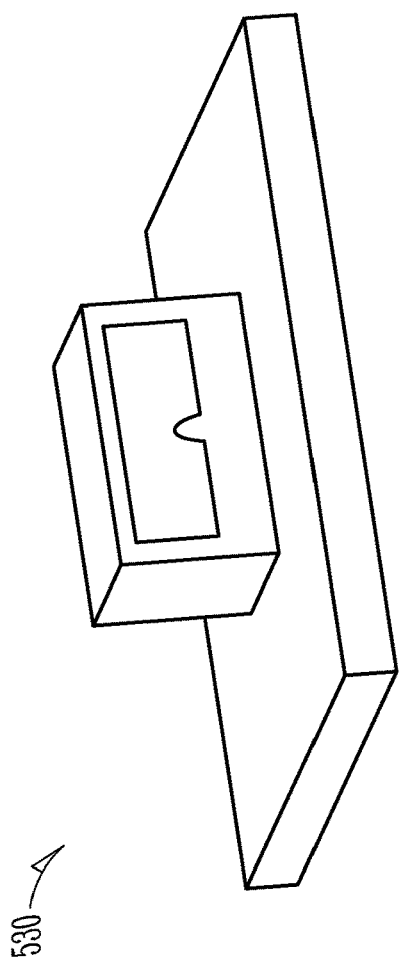

GAS SENSORS USING NON-DISPERSIVE INFRARED MATERIALS

PRIORITY CLAIM

This application claims the benefit of priority to U.S. Provisional Patent Application Ser. No. 63/285,013, filed Dec. 1, 2021, which is incorporated herein by reference in its entirety.

TECHNICAL FIELD

The present disclosure relates to detecting a concentration of a gas.

BACKGROUND

There is ongoing effort to improve detecting a concentration of a gas. In particular, gas detectors in many commercial applications may be bulky and difficult to install. Thus, it is desirable to reduce the size of gas chambers used to detect the gas.

BRIEF DESCRIPTION OF THE DRAWINGS

FIGS. 4A-4C show cross-sectional side views of examples of gas sensing systems, in accordance with some embodiments.

FIG. 5A shows a flow chart of a method to assemble a gas sensor module, in accordance with some embodiments.

FIGS. 5B-5F show physical implementations of operations of the method of FIG. 5A.

Figure 1:
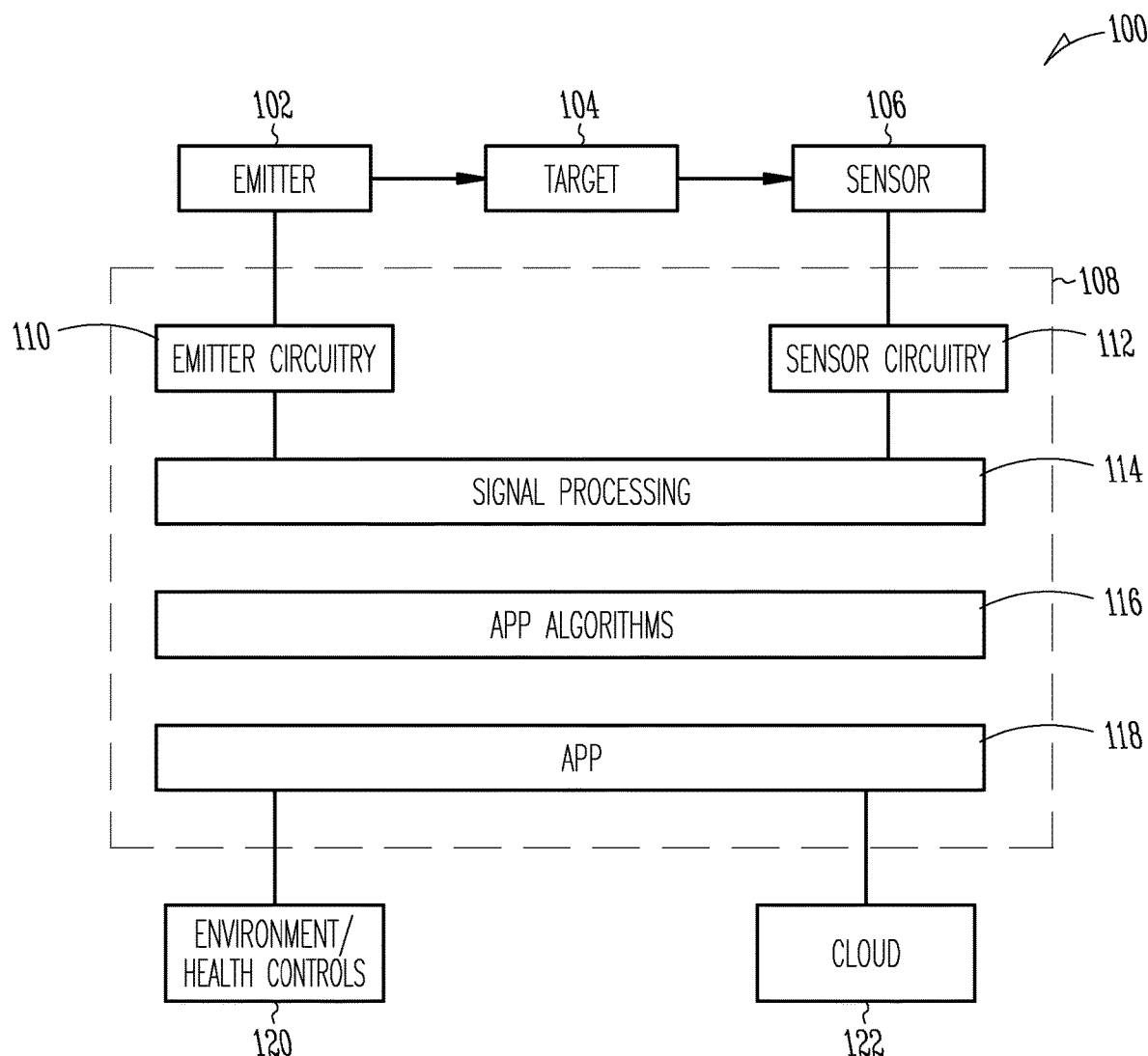
FIG. 1 shows a schematic drawing of an example of a gas sensing system, in accordance with some embodiments.

Corresponding reference characters generally indicate corresponding parts throughout the several views. Elements in the drawings are not necessarily drawn to scale. The configurations shown in the drawings are merely examples and should not be construed as limiting the scope of the disclosed subject matter in any manner.

DETAILED DESCRIPTION

Gas detection is becoming more common for a variety of applications. For example, detecting concentration levels of methane can help guide downstream decisions in the fields of industrial oil and gas exploration, safety, climate change, and others. Detecting concentration levels of formaldehyde and/or volatile organic compounds (VOCs) can help guide downstream decisions in the fields of air quality, safety, and others. Detecting concentration levels of carbon dioxide can help guide downstream decisions in the fields of smart buildings, air quality, capnography, climate change, and others. Detecting concentration levels of carbon monoxide and/or nitrogen dioxide can help guide downstream decisions in the fields of safety and others. Detecting concentration levels of ammonia, sulfur hexafluoride, and/or volatile organic compounds can help guide downstream decisions in the fields of refrigeration, electrical systems, and others. Detecting concentration levels of glucose can help guide downstream decisions in the fields of medicine and others.

Some gas detection systems can make use of a natural absorption of a gas material. For example, methane is found to be absorbent at a wavelength of about 3.3 microns. When a gas sample is illuminated with light at the wavelength of about 3.3 microns, methane in the gas sample can absorb some of the illumination. A sensor or detector in the gas detection system can measure the illumination remaining after the illumination passes through the gas sample.

One category of these illumination/detection gas detection systems can be based on the Beer-Lambert Law. In this category, the gas detection system illuminates the gas with light at or near the absorbent wavelength (or with light having a spectrum that includes the absorbent wavelength) and detects how much of the illuminating light passes through the gas sample. Based on the fraction of illuminating light that emerges from the gas sample, the gas detection system can calculate a concentration level of the particular gas in the gas sample. Such non-dispersive infrared (NDIR) gas sensing systems detects light specific to the targeted gas.

For gas detection systems based on the Beer-Lambert Law, the sensitivity and/or accuracy can scale with an optical path length over which the absorption can occur. As a result, gas detection systems with larger gas chambers tend to be more sensitive and/or more accurate than those with smaller gas chambers. For example, in a gas detection system in which the gas chamber is hollow, the illumination can progress in a straight line through the gas chamber, such that the optical path length can be comparable to a dimension of the gas chamber. Thus, example gas chamber dimensions may be 8 mm×33 mm×20 mm. However, it is desirable to shrink the size of gas detection systems to enable incorporation into more consumer goods, such as in a heating, ventilation, and air conditioning (HVAC) system, a smart speaker, in an automobile (such as in a fuel system, an in-cabin ventilation system, and/or an exhaust system), a refrigeration system, and others. However, shrinking the gas detection systems to fit into smaller spaces can compromise the sensitivity and/or accuracy of the system. As a result, the measurements in such systems may be exceedingly sensitive to noise, thereby demanding the use of additional electronic filters to improve the detection limit.

To improve the sensitivity and/or accuracy of the system, various embodiments of the gas detection systems described herein dispose a porous solid scattering material in the gas chamber and/or in a wall surrounding the gas chamber, so that in some cases, the gas being detected can permeate hollow spaces within the porous scattering material. The scattering material can be transparent at about the illuminating wavelength (e.g., the wavelength at which the gas material is absorbent). Such scattering materials may include porous silicon, porous yttrium aluminum garnet (YAG), porous alumina, and porous titanium oxide ($TiO_2$), among others.

The scattering material can greatly increase an optical path length of illuminating light that passes through the scattering material, compared with a single pass through a given volume (e.g., a linear dimension of the porous scattering material, or a path that would be taken if the space occupied by the porous scattering material were instead hollow). For example, in various embodiments of the gas detection system described herein, the scattering material can redirect the illumination multiple times within the scattering material. The actual optical path traversed by the illumination in the scattering material can be orders of magnitude larger than the actual size of the scattering material. As a result, the optical path length experienced by the illumination can be significantly greater than a dimension of the gas chamber, such by a factor of 10, 100, or more.

As a result of locating the porous scattering material inside the gas chamber and/or in a wall of the gas chamber, the gas chamber size can be decreased significantly, in order to maintain a sensitivity/accuracy comparable to what would be achieved by a system having a hollow gas chamber. Consequently, the gas detection systems described herein, which can dispose a porous scattering material in the gas chamber and/or in a wall of the gas chamber, can be significantly smaller than comparable systems that have a hollow gas chamber (optionally with impermeable walls), while achieving sensitivity/accuracy performance comparable to systems that have a hollow gas chamber (optionally with impermeable walls).

In some embodiments, a gas sensing system can allow a gas sample to permeate hollow spaces within a porous scattering material. The porous scattering material can be substantially transparent at an illumination wavelength. An emitter can illuminate the porous scattering material and the gas sample with light having a spectrum that includes the illumination wavelength. A sensor can detect a level of light that has traversed the porous scattering material. Using an application of the Beer-Lambert Law, the system can determine a concentration of the gas material in the gas sample. The scattering can greatly increase an optical path length through the porous scattering material, compared with a linear dimension of the porous scattering material (e.g., a path that would be taken if the space occupied by the porous scattering material were instead hollow). The increased optical path length can allow a gas chamber to shrink in size, thereby decreasing a size of the gas sensing system without a corresponding decrease in a sensitivity and/or an accuracy of the system.

FIG. 1 shows a schematic drawing of an example of a gas sensing system 100, in accordance with some embodiments. As shown in the example of FIG. 1, an emitter 102 can emit light toward a target volume 104 (which is also referred to herein as a target 104). The target 104 can include a porous scattering material, such as disposed in a gas chamber and/or in one or more walls of a gas chamber, so that a gas sample can permeate hollow spaces within the porous scattering material, such as inside the gas chamber. A sensor 106 can detect light, emitted from the emitter 102, that has traversed through the target 104. At least one processor 108, coupled to the sensor 106, can determine a concentration of a specified gas material in the gas sample. Although only one processor is shown, in other embodiments, multiple processors may be used in the various embodiments herein.

The emitter 102 can be selected to emit light that can include a wavelength that is relatively strongly absorbed by the gas material that is to be detected. For example, methane has an absorption peak (e.g., a wavelength at which absorption is relatively large, compared to the absorption at adjacent wavelengths) at a wavelength of about 3.3 microns. To detect a concentration of methane in the gas sample, the emitter 102 can emit light at about 3.3 microns. Similarly, the emitter 102 can emit light at about 3.6 microns to detect formaldehyde and/or volatile organic compounds. The emitter 102 can emit light at about 4.3 microns to detect carbon dioxide. The emitter 102 can emit light at about 4.5 microns to detect carbon monoxide. The emitter 102 can emit light at about 4.7 microns to detect nitrogen dioxide. The emitter 102 can emit light at about 9 microns to detect ammonia, sulfur hexafluoride, and/or certain volatile organic compounds. The emitter 102 can emit light at about 10.4 microns to detect glucose. These numerical values are provided as examples only. Other suitable wavelengths can also be used to detect other gas materials or compounds.

The emitter 102 can emit light having a spectrum that is relatively sharply peaked compared to a broadband emitter like an incandescent lamp, which can be affected/absorbed by many substances. A sharp emitter is useful, even if methane and formaldehyde absorptions are close, in cases where it is known that only one of the two gases exists. The emitter 102 can emit light having a spectrum that is relatively broad. The emitter 102 can emit light having a spectrum that includes the wavelength at which absorption of the gas material or compound is relatively high. The emitter 102 can emit light in the infrared portion, the visible portion, and/or the ultraviolet portion of the electromagnetic spectrum. A filter (not shown) can be placed between the emitter 102 and the target 104 so as to provide light to the target 104 at a predetermined wavelength. The emitter 102 can emit light in the Middle Wavelength Infrared (MWIR) portion of the electromagnetic spectrum, with a wavelength range extending from about 3 microns to about 5 microns. The emitter 102 can emit light in the Long Wavelength Infrared (LWIR) portion of the electromagnetic spectrum, with a wavelength range extending from about 8 microns to about 14 microns.

In various embodiments, the emitter 102 can include one or more light-emitting diodes (LEDs). The one or more light-emitting diodes can include III-V semiconductor materials (or other semiconductor materials from, for example, II-VI columns). The one or more light-emitting diodes can include gallium antimonide (GaSb), indium phosphide (InP), indium arsenide (InAs), or other suitable materials. The emitter 102 can include one or more lasers. The emitter 102 can include one or more broadband sources that are spectrally filtered.

The target 104 can include a porous scattering material, such as porous alumina, porous silicon, porous YAG, porous $TiO_2$, and others. The porous scattering material can be disposed in a gas chamber and/or in a wall or walls of the gas chamber, so that a gas sample can permeate hollow spaces within the porous scattering material inside the gas chamber and/or in the wall or walls of the gas chamber. The porous scattering material can be transparent, or substantially transparent, at the wavelength of the light emitted by the emitter 102. The porous scattering material can be transparent, or substantially transparent, at the wavelength at which the gas sample is relatively absorbent. The target 104 and the porous scattering material can be sized and shaped in any suitable manner, as provided herein.

The sensor 106 can detect light, emitted from the emitter 102, that has traversed through the target 104. The sensor 106 can include one or more pixels (e.g., detector elements or sensor elements) or other types of sensors known in the art. In some embodiments, the sensor 106 can be separate from the emitter 102. The sensor 106 can include one or more sensor elements that are formed from a same or similar semiconductor material (e.g., III-V compound semiconductors) that is used in the emitter 102.

The sensor 106 can optionally be formed integrally with the emitter 102. For example, the sensor 106 and the emitter 102 can both be formed as light-emitting diodes in a single array or in a single integral package. The emitter 102 can be forward biased. The sensor 106 can include, for example, one or more reverse biased p-n junctions or a quantum well structure. Other configurations can also be used.

The processor 108, coupled to the sensor 106, can determine a concentration of a specified gas material in the gas sample based on scattered light collected by the sensor 106. The processor 108 can include emitter circuitry 110 that can drive the emitter 102. The processor 108 can include sensor circuitry 112 that can determine a power level of light that strikes the sensor 106. The sensor circuitry 112 can optionally include an analog-to-digital converter (ADC), among others. The processor 108 can include signal processing circuitry 114 that can analyze an output of the sensor circuitry 112. For example, the signal processing circuitry 114 can receive a value that represents a sensed optical power value, and can calculate, from the received value, a concentration level of the gas material in the gas sample. The signal processing circuitry 114 can employ the Beer-Lambert Law to perform the calculation, although other suitable calculations can be performed; for a three-dimensional chamber a dedicated calibration or calculation is used to deduce adequate concentration values to be output. The processor 108 can include one or more application algorithms 116 that can serve as an interface between the signal processing circuitry 114 and an application that includes a user interface. The processor 108 can include one or more applications 118 that can interface with the one or more application algorithms 116. The one or more application algorithms 116 can communicate with one or more servers dedicated to the environment and/or health controls 120. The one or more application algorithms 116 can communicate with one or more servers connected to the cloud 122.

The gas sensing system 100 can optionally detect two or more gas materials in a single gas sample. The two or more gas materials can have different wavelengths at which the respective gas materials are relatively absorbent. The emitter 102 can emit light at respective two or more wavelengths—e.g., either by emitting light having a set of wavelengths that is broad enough to be absorbed by the different gas materials or using different emitters that emit at the different wavelengths. The sensor 106 can sense light at the two or more wavelengths. To sense at the wavelengths, the gas sensing system 100 can include one or more wavelength-sensitive filters, such as to direct one wavelength onto one sensor element and direct another wavelength onto another sensor element, different sensors may be used that are able to detect at least one of the wavelengths emitted by emitter 102 and unable to detect at least one other of the wavelengths emitted by emitter 102.

In some examples, the emitter 102 can optionally emit reference light having a spectrum that includes a reference wavelength different from the detection wavelength. A single wideband emitter may be used, or separate emitters may be used that are tuned to each desired wavelength. The gas sample can interact with the light at the detection wavelength but may not interact with the reference light at the reference wavelength. The sensor 106 can optionally detect at least some of the reference light. The at least one processor 108 can use the level of the reference light at the sensor 106, in addition to the level of the detection light at the sensor 106, to determine the concentration of the gas material in the gas sample. In some examples, for which the gas sensing system 100 can sense two different gas materials, the emitter can emit a first wavelength and a second wavelength. The wavelengths can be selected such that a first gas interacts with the first wavelength but not the second wavelength and a second gas interacts with the second wavelength but not the first wavelength. Light at the second wavelength can serve as a reference for detecting the first gas, while light at the first wavelength can serve as a reference for detecting the second gas. Other combinations can also be used.

Figure 2A:
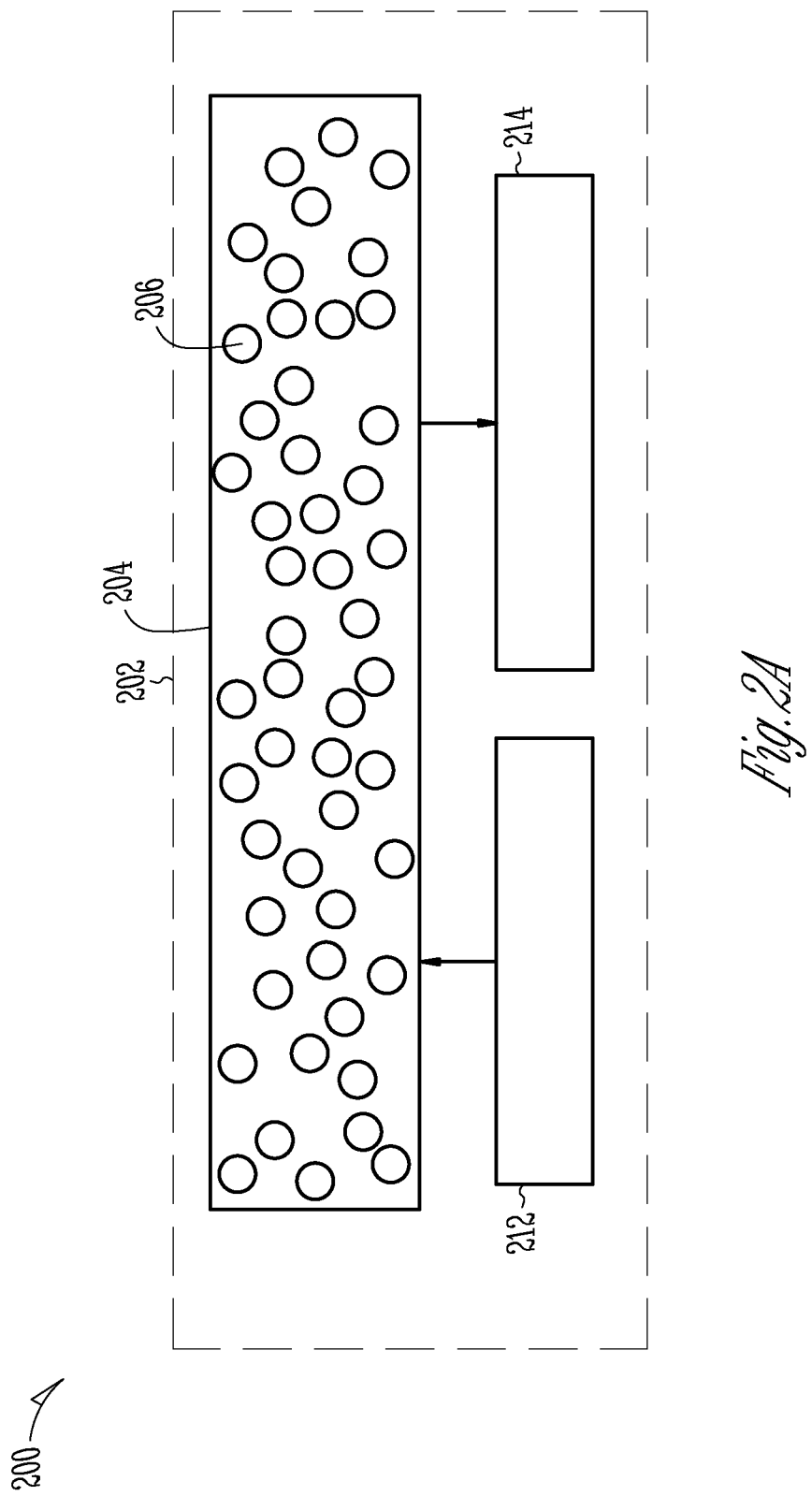
FIG. 2A shows a cross-sectional side view of an example of a gas sensing system, in accordance with some embodiments.

FIG. 2A shows a cross-sectional side view of an example of a gas sensing system 200, in accordance with some embodiments. FIG. 2A omits the circuitry such as that in FIG. 1 to operate electronics in the gas sensing system 200; any suitable circuitry can also be used as will be recognized by a person of ordinary skill in the art upon reading and understanding the disclosed subject matter.

The gas sensing system 200 contains a gas chamber 202 with a target volume 204 (also referred to herein as a target 204), a light emitter 212, and a light sensor 214. FIG. 2A omits plumbing of the gas chamber 202, which can controllably pump a gas sample into the gas chamber 202 before a measurement has been taken and can controllably pump the gas sample out of the gas chamber 202 after the measurement has been taken. The gas sensing system 200 can include an intake through which the gas sample is introduced into the gas chamber 202 and an outlet through which the gas sample exits the gas chamber 202.

Figure 2B:
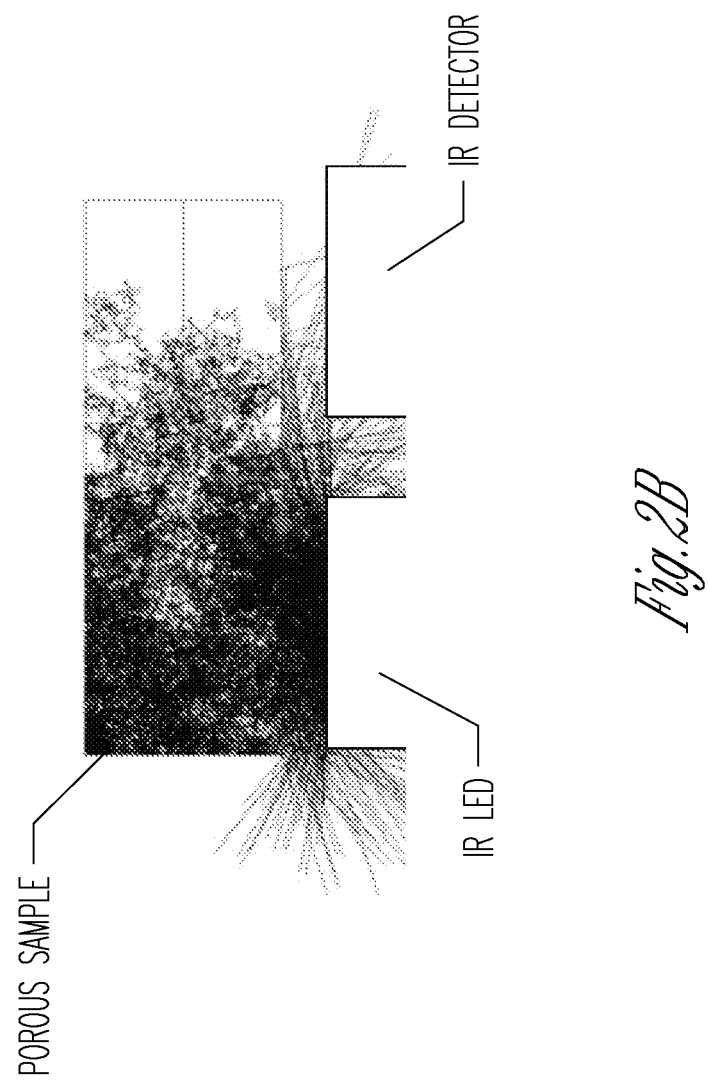
FIG. 2B shows a cross-sectional side view of ray traces of an example of a gas sensing system, in accordance with some embodiments.

The light emitter 212 can be the same or similar to the emitter 102 of FIG. 1. One or more light sources may be used to form the light emitter 212 and light sensor 214. The light emitter 212 may emit light generally in a direction toward the target 204 and thus the gas sample. In some embodiments, the light may be emitted in substantially all directions simultaneously and reflectors used to direct the light towards the target 204. The light can propagate away from the light emitter 212, through the target 204 and thus gas sample. Although the light emitter 212 and light sensor 214 in FIGS. 2A-2B are shown as being planar (i.e., emitting and receiving at parallel angles), in other embodiments one or both of the light emitter 212 and light sensor 214 may be angled toward or away from each other (as shown in other examples below) to improve the absorption by gas sample by increasing the path length.

In the configuration of FIG. 2A, the light sensor 214 may the same as or similar to the sensor 106 of FIG. 1. The light impinging on the light sensor 214 has traversed one of a range of optical paths from the light emitter 212 to the light sensor 214 as shown in FIG. 2B. With continuing reference to FIG. 2A, FIG. 2B shows a cross-sectional side view of ray traces of an example of a gas sensing system 200, in accordance with some embodiments. The light sensor 214 may, in some embodiments, be able to detect light emitted by the light emitter 212, which may be between about 3 μm to about 10 μm.

The target 204 can be formed from or include a porous scattering material. The target 204 may contain particles 206 that are transparent to MWIR wavelengths. The particles 206 may be formed in any configuration, such as being close packed or random, and may have a continuous or discontinuous gradient along one or more axes. In some cases, rather than particles, the target 204 may contain hollow spaces that may be gas permeable; that is, the gas sample may be able to permeate the hollow spaces (non-permeable likewise means that the gas molecules cannot penetrate the material). As shown in FIG. 2B, the light that enters the target 204 may scatter multiple times within the target 204 due to the porous scattering material, thereby increasing the path length of the light by a substantial amount and increasing the absorption of the light by the gas sample. In some embodiments, the plumbing may move the gas sample into and/or out of the target 204. The target 204 can be located between the light emitter 212 and the light sensor 214. Use of a target 204 that provides scattering of the light may be able to reduce the size of the cavity of the gas chamber 202, e.g., from about 30 mm to about 50 mm along a characteristic dimensions (e.g., long axis) to less than about 1 cm while still providing similar or enhanced sensitivities to the gas(es) to be detected (e.g., being able to determine $CO_2$ concentrations between about 400 ppm and about 420 ppm).

The light emitter 212 and light sensor 214 can be disposed in a lateral configuration in which the light emitter 212 and light sensor 214 are located in a side-by-side arrangement, as shown in FIG. 2A. Other elements, such as light guiding elements to guide light emitted by the light emitter 212 to light sensor 214 are not shown in FIG. 2A for convenience. Such an arrangement allows the light emitter 212 and light sensor 214 to be combined in a single gas sensor module that can be attached on a board (e.g., a printed circuit board (PCB)) by, for example, a surface mount device (SMD) attach method.

However, measurement and simulation show that there is uncertainty in gas (e.g., $CO_2$) concentration measurements in the configuration of FIG. 2A, as illustrated in FIG. 2B. This is due to behavior of the light as it encounters the scattering material. In particular, as can be seen in FIG. 2B, in some situations many of the rays may be reflected at the bottom interface of the target 204; in this case, the rays are scattered outside of the detector area or are scattered directly to the light sensor 214 without first interacting with gas molecules inside the target 204.

Figure 3A:
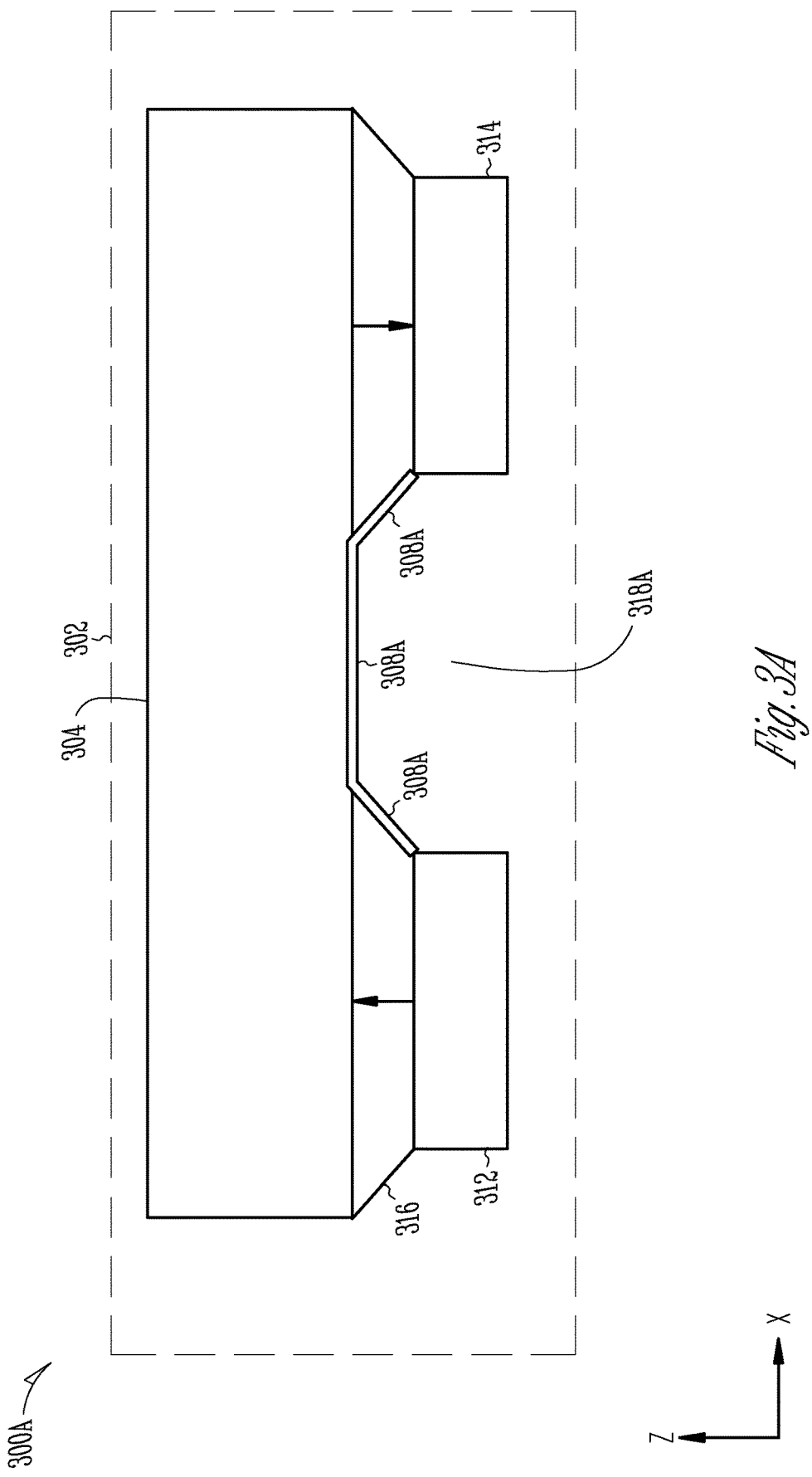
FIGS. 3A-3C show cross-sectional side views of examples of gas sensing systems, in accordance with some embodiments.
Figure 3B:
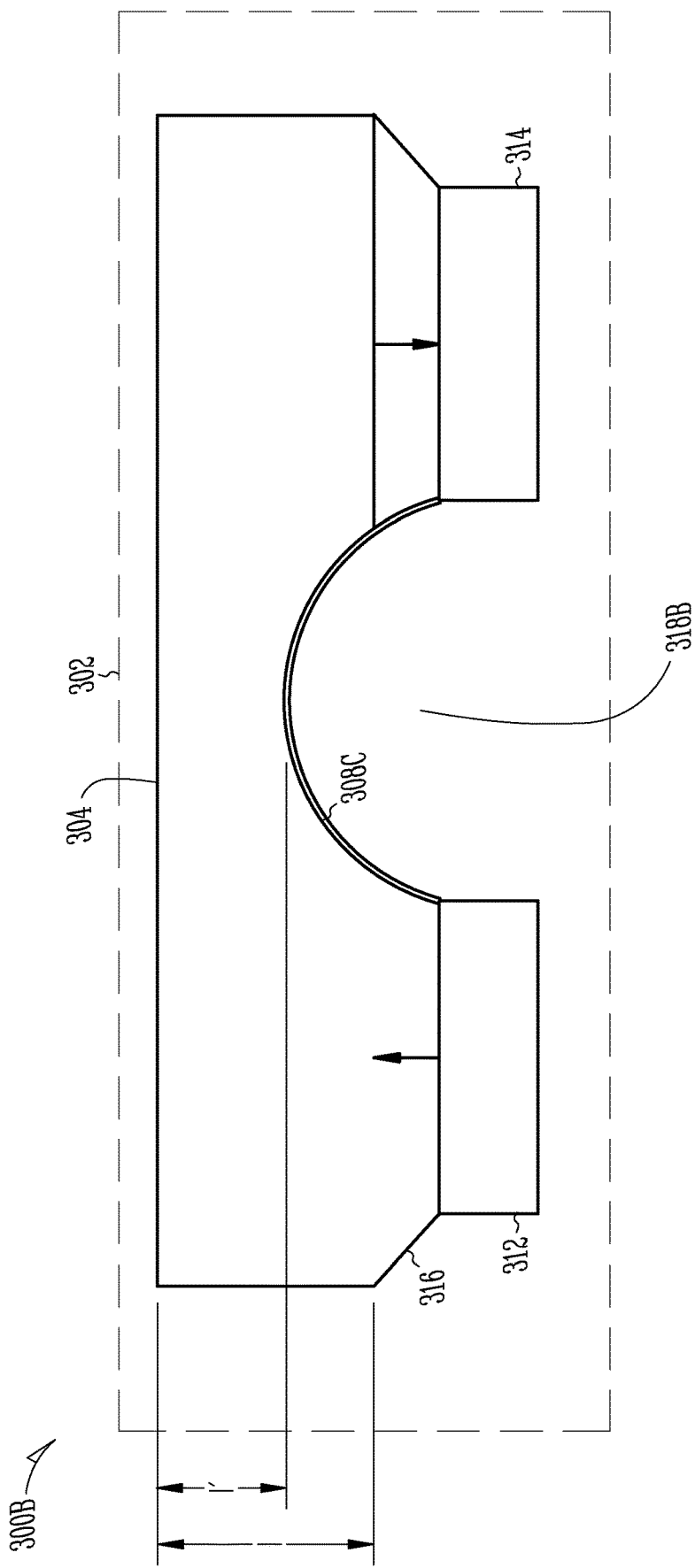
Figure 3C:
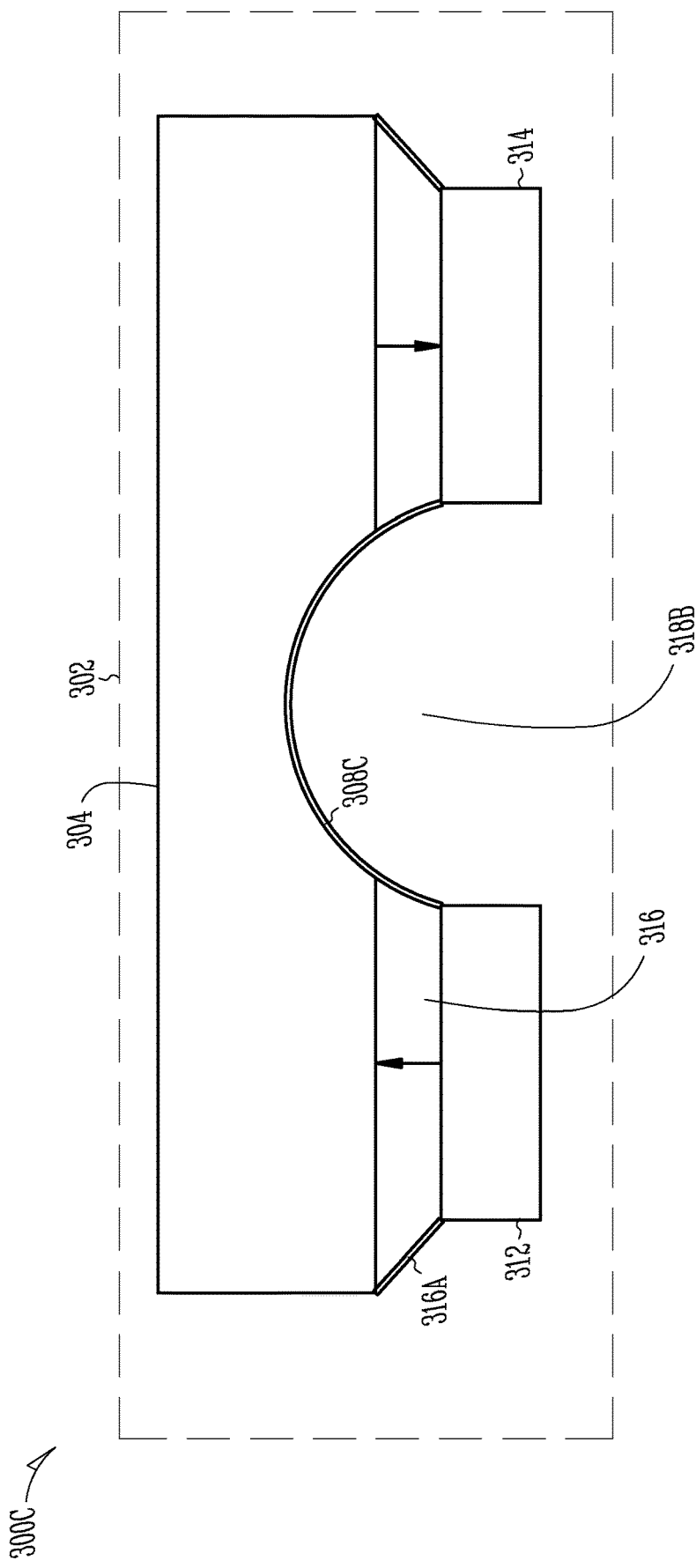

FIGS. 3A-3C show cross-sectional side views of examples of gas sensing systems 300a-300c, in accordance with some embodiments. Each of the gas sensing systems 300a-300c contains a gas chamber 302 with a target volume 304 (also referred to herein as a target 304), a light emitter 312, and a light sensor 314. In each of the gas sensing systems 300a-300c of FIGS. 3A-3C, vertical optical separation may be added between the light emitter 312 and the target 304 and between the light sensor 314 and the target 304 (as shown at a bottommost portion of the target 304), to increase the amount of effective scattering. As shown in FIGS. 3A-3C, the term "vertical" herein refers to the direction from the light emitter 312/light sensor 314 and the target 304 (shown as the z direction in FIG. 3A). This vertical optical separation may help to avoid direct transmission of optical rays from the light emitter 312 to light sensor 314 without passing through the target 304 and therefore increase the measurement accuracy. Similarly, the term "lateral" as used herein is shown as the x direction in FIG. 3A. The target 304, light emitter 312, and light sensor 314 shown in FIGS. 3A-3C may be similar to those shown and described above in FIG. 2A.

As shown in FIG. 3A, the gas sensing system 300a may include a vertical separator 318a that provides the vertical optical separation in the gas chamber 302. The vertical separator 318a may contain a material with different optical properties than a medium 316 (e.g., optical coupler) situated between the light emitter 312 and the target 304 and the medium situated between the light sensor 314 and the target 304. The medium 316 may be formed from glass, a multilayer structure that includes a scattering layer, or one or more other materials transparent to the light emitted by the light emitter 312. Thus, the vertical separator 318a may be a material (e.g., a physical material or air) that has a refractive index sufficiently small such that light from the light emitter 312 may be reflected back into the medium 316. The vertical separator 318a may be part of the scattering material of the target 304 or may be part of the LED package that contains the light emitter 312 and the light sensor 314. To further improve the sensitivity of the gas sensor, the surface of the medium 316 may be reflective (or a reflective coating 308a may be provided on the surface) having, for example, a reflectivity of about 90% or greater at a perpendicular incidence to guide light from the light emitter 312 towards the porous material of the target 304. The use of the reflective coating 308a may increase the materials that are able to be used to provide the vertical separator 318a. While the reflective coating may be provided on the opposite lateral side of the medium 316 (i.e., the sides adjacent to the sides of the light emitter 312 and the light sensor 314 most distal from the vertical separator 318a), in some embodiments the reflective coating 308a may be provided only on the sides between the light emitter 312 and the light sensor 314. Simulations show that the use of a reflective coating 308a between the light emitter 312 and the light sensor 314 increases the measurement response.

To further improve the sensitivity of the gas sensor, the vertical optical separation between the light emitter 312 and the light sensor 314 can be extended as shown in the gas sensing system 300b of FIG. 3B. That is, in FIG. 3A, the vertical separator 318b may terminate at a bottom surface of the target 304 (the surface facing the light emitter 312 and the light sensor 314), in which the bottom surface of the target 304 may be substantially planar about a vertical separator 318b. In FIG. 3B, however, the gas sensing system 300b may include a vertical separator 318b that extends further into the target 304 than the planar surface of the bottom of the target 304 shown in FIG. 3A, which may force optical rays to penetrate deeper into the target 304 and therefore increase the optical path length. The vertical separator 318b may be formed from a solid material that is opaque to the light emitted by the light emitter 312 or the bottom surface of the target 304 facing the light emitter 312 and the light sensor 314 may contain a depression. The distance (l) between the surface of the target 304 facing the light emitter 312 and the light sensor 314 and the opposing surface of the target 304 is larger than the distance (l') between the surface of the target 304 containing the depression and the opposing surface of the target 304. Although the vertical separator 318b shown in FIG. 3B is shown as curved (e.g., convex or concave), the vertical separator 318b may have any shape as fabricated. The surface 308c of the vertical separator 318b may be reflective (or a reflective coating may be provided) to further guide optical rays towards the porous material of the target 304. The distance of extension of the vertical separator 318b into the target 304 may be determined by simulation, e.g., to provide a minimum predetermined sensitivity to a particular gas sample.

To further improve the sensitivity of the gas sensor, the outer edges 316a of the medium 316 may be reflective (or a reflective coating may be provided) to further guide optical rays towards the porous material of the target 304, as shown in the gas sensing system 300c of FIG. 3C.

Optical simulation of the gas sensing system has been performed to evaluate the gain of the arrangements of FIGS. 3A-3C. In the model used in the simulation, the sample size is about 3 mm by about 2 mm by about 1 mm. The distance between the light emitter, the light sensor and the target is about 0.25 mm. The porous material in the target is made of close packed spherical $Al_2O_3$ particles with an approximate 10 μm size. The porous material has a porosity of about 40%. Scattering is represented by a Mie Model. In order to measure a photocurrent higher than the detection limit, 3 faces of the target are considered reflective. To quantify the detection sensitivity of the module, the Figure Of Merit (FOM) variable representing the ratio between optical power measured in air divided by optical power measured in $CO_2$ has been selected. It is understood that the target is to have the FOM variable as high as possible. In this model, the gas diffusion kinetic is not taken into account; instead, it is assumed that all pores of the target are filled by the incident medium gas (air or sensed gas).

$$\text{Figure of Merit: Response Change}_{Air/CO2} = \frac{\text{Optical power}_{pores\,filled\,with\,air}}{\text{Optical power}_{pores\,filled\,with\,CO2}}$$

Table 1 provides the FOM of a gas sensing system in which the light emitter and the light sensor are arranged in a lateral configuration with the arrangements shown in FIGS. 3A-3C (where configuration 1 in Table 1 is shown as FIG. 3A, configuration 3 in Table 1 is shown as FIG. 3B, and configuration 3 in Table 1 is shown as FIG. 3C).

TABLE 1

| Configuration number | Technical features | FOM (u.a.) |
|---|---|---|
| POR | No | 1.03 |
| 1 | Reflective vertical wall | 1.24 |
| 2 | Reflective extended vertical wall | 3.03 |
| 3 | Reflective extended vertical wall and reflective sidewalls | 3.06 |

As shown in Table 1, the FOM increases significantly when the optical separation is reflective. Moreover, the FOM increases with increasing penetration of the optical separation until the optical separation reaches the target.

In different embodiments, the gas sensing system may have a target whose faces are diffusive reflective and/or specular reflective formed respectively by scattering or reflective material. The diffusive/specular reflective material in such embodiments may not be gas permeable. In some embodiments, the faces may all provide the same type of scattering (diffusive or specular), whereas in other embodiments at least one of the faces may provide a different type of scattering as at least one other of the faces.

Figure 4A:
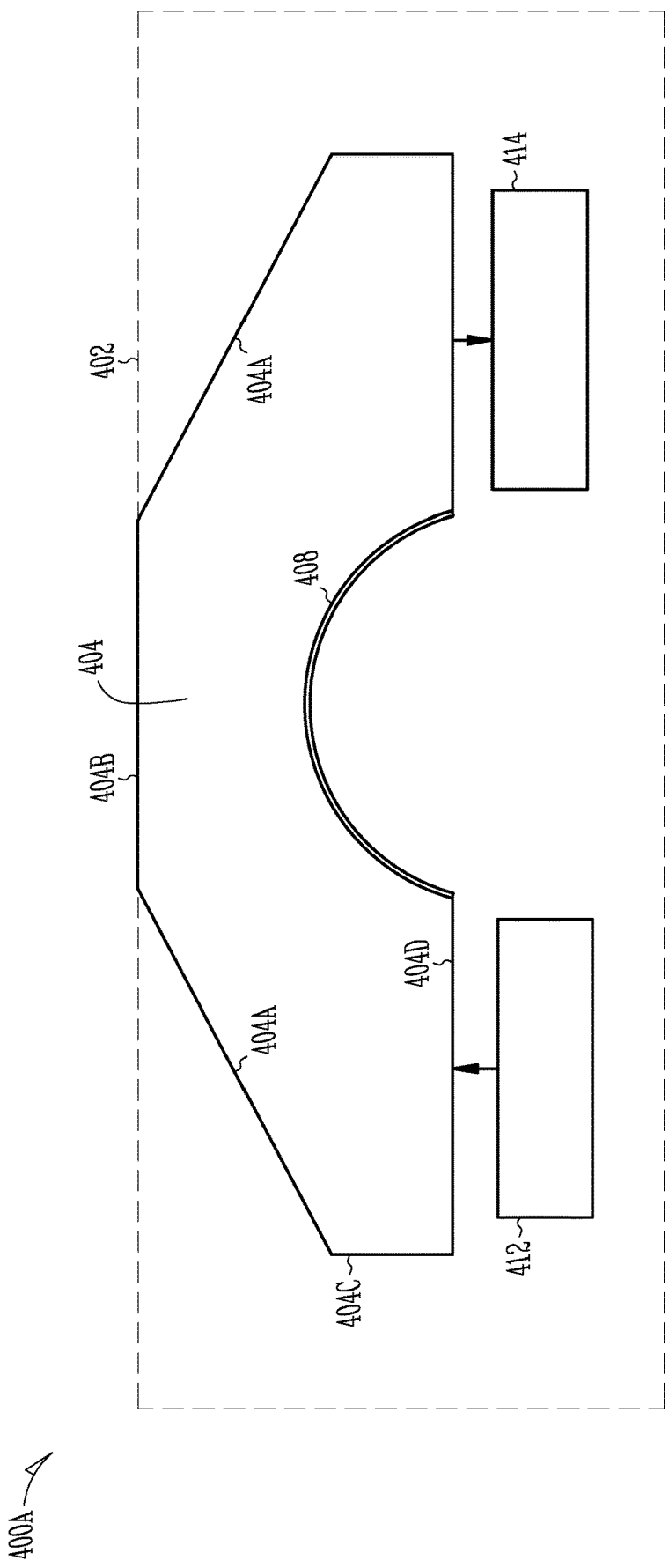

FIGS. 4A-4C show cross-sectional side views of examples of gas sensing systems 400a-400c, in accordance with some embodiments. Each of the gas sensing systems 400a-400c contains a gas chamber 402 with a target volume 404 (also referred to herein as a target 404), a light emitter 412, and a light sensor 414. As above, the target 404 may be formed from a porous, gas permeable material. The light emitter 412 and the light sensor 414 may be the same as or similar to the emitter 102 and the sensor 106, respectively, of FIG. 1. Although not shown, in some embodiments one of more anti-reflection coatings may be added to the surfaces of the target 404 opposing the light emitter 412 and the light sensor 414 in any of the figures herein to permit the light to pass through these surfaces while reducing the amount of reflection.

The target 404, light emitter 412, and light sensor 414 in the gas sensing system 400a of FIGS. 4A-4C may also be similar to those shown and described above in FIG. 2A. As shown, the target 404 may be chamfered; that is, as shown in FIG. 4A the corners distal from the light emitter 412 and the light sensor 414 may be truncated to form angled faces 404a distal to each of the light emitter 412 and the light sensor 414 instead of having approximately right angles as shown in FIGS. 3A-3C. The angled faces 404a may be connected by a top face 404b of the target 404. The angled faces 404a may form any desired obtuse angle (e.g.) 135° with the top face 404b of the target 404 and with the sidewalls (side faces) 404c of the target 404. Bottom faces 404d of the target 404 may be adjacent to the sidewalls 404c of the target 404 and may be coupled together by the extension 408 of the target 404. The angled faces 404a may extend laterally to respectively oppose substantially the entirety of the light emitter 412 and the light sensor 414. As above, at least some of the faces (the angled faces 404a, top face 404b, sidewalls 404c) may be either a diffusive and/or specular reflective face. Although the angled faces 404a are shown as being substantially linear, other shapes may be used, such as a curved (e.g., convex or concave) surface.

Similarly, in FIG. 4B, the light emitter 412 and the light sensor 414 in the gas sensing system 400b may be disposed opposing the sidewalls 404c of the target 404 instead of opposing the bottom faces 404d of the target 404, as shown in FIG. 4A. This may permit the overall gas sensing system 400b to be reduced in thickness (in the vertical direction) compared with the gas sensing system 400a shown in FIG. 4A. Consequently, the light emitter 412 and the light sensor 414 may be adjacent to the angled faces 404a in FIG. 4B. In other embodiments, the sidewalls 404c of the target 404 may extend from the bottom faces 404d to the top face 404b, that is, the angled faces 404a may not be present. As above, at least some of the faces (the angled faces 404a, top face 404b, and bottom faces 404d) may be either a diffusive and/or specular reflective face.

Similar to the above, in FIG. 4C, the light emitter 412 and the light sensor 414 in the gas sensing system 400c may be disposed opposing the angled faces 404a of the target 404 instead of opposing the bottom faces 404d of the target 404, as shown in FIG. 4A, or the sidewalls 404c of the target 404, as shown in FIG. 4B. This, too, may permit an overall version of the gas sensing system 400c to be reduced in thickness (in the vertical direction) compared with the gas sensing system 400a shown in FIG. 4A. As above, at least some of the faces (the top face 404b, sidewalls 404c and bottom faces 404d) may be either a diffusive and/or specular reflective face. The sidewalls 404c of the target 404 may be substantially planar, as shown, and larger than each of the light emitter 412 and the light sensor 414 to permit the light to uniformly pass through the sidewalls 404c of the target 404. In some embodiments, retaining elements (such as perpendicular extensions) may be added to (or may be formed when fabricating the target 404) the sidewalls 404c of the target 404 and sized to each of the light emitter 412 and the light sensor 414 to retain each of the light emitter 412 and the light sensor 414 therein.

In the embodiments of FIGS. 4A-4C, the light emitter 412 and the light sensor 414 are shown as having a surface opposing the target 404 (or the medium) that is substantially parallel with the surface of the target 404 (or the medium) opposing the light emitter 412 and the light sensor 414. In other embodiments, the light emitter 412 and/or the light sensor 414 may have an angled surface that is deliberately angled (e.g., non-parallel at at least a few degrees) with respect to the opposing surface of the target 404 or the medium. The relative angle of the light emitter 412 and/or the light sensor 414 may be, for example, about 45° to further optimize the transmit/receive path.

In the embodiments of FIGS. 4A-4C, the light emitter 412 and the light sensor 414 are shown as having a substantially rectangular (e.g., square) shape. In other embodiments, the light emitter 412 and/or the light sensor 414 may have other geometric shapes (e.g., octagonal), depending on the fabrication techniques used to create the light emitter 412 and/or the light sensor 414 and the geometries of the overall structure of the gas sensing system and/or space into which the gas sensing system is to fit.

FIG. 5A-5E shows an example of a method 500 to assemble a gas sensor module, in accordance with some embodiments. Specifically, FIG. 5A shows a flow chart of the method 500, while FIGS. 5B-5E show physical implementations of operations of the method of FIG. 5A. The method 500 includes shaping, at operation 502, a porous target 512 to obtain a small dip 512a in the middle of a bottom of the porous target 512, as shown in FIG. 5B. For example, the dip 512a may have a depth smaller than the half of the emitter-detector distance. At operation 504, an overmold 514 may be formed around the porous target 512, as shown in FIGS. 5C and 5D. The overmold 514 may fill the small dip 512a with a projection 514c that acts as the vertical separator while leaving openings 514d for the light emitter and the light sensor adjacent to the dip 512a, as shown in the cross section shown in FIG. 5D. In addition, the overmold 514 may expose at least one face 512b of the porous target 512 for gas incursion. The overmold 514 may be formed, for example, of a scattering diffusive white material, such as plastic. At operation 506, the light emitter 516 and the light sensor 518, which may be formed as separate chips, may be attached to an intermediate submount tile or directly on a PCB 520, as shown in FIG. 5E. At operation 508, the overmolded porous target structure may be attached to a top of the submount or PCB using an adhesive to form a gas sensor module 530, as shown in FIG. 5F. In other embodiments, rather than use a scattering diffusive material, the overmold 514 may be formed from a different material and a scattering diffusive coating. Moreover, rather than using a scattering diffusive coating, a purely reflective coating may be used for the optical separation in the overmold 514 or faces of the porous target 512 to obtain reflectivity.

Accordingly, in some of the above embodiments, the walls of the gas chamber may be a smooth reflective surface (or have a reflective coating) of at least the wavelength emitted by the light emitter. This smooth reflective surface at a wavelength of interest permits the light from the light emitter (whether scattered by the external surface of the target or the scattering material inside the target) that strikes the reflective surface to be specularly reflected (reflected without scattering, such that light with a single incident direction can reflect with a single exiting direction) from the reflective surface. Alternatively, or in addition, the reflective surface may be textured so that some or all of the walls of the gas chamber may be diffusive. The diffusing portion of the walls of the gas chamber can diffusely reflect the light ray into multiple light rays having multiple propagation directions. To accomplish the diffuse reflection, the diffusing portion can be roughened, such as roughened at the scale of middle wavelength infrared (MWIR) wavelengths, which would generate a randomized reflection from such a roughened surface for light in the range of MWIR wavelengths. In some examples, the diffusing portion can be formed by disposing a reflecting layer, such as aluminum, on frosted glass. Other manufacturing techniques can also be used. Thus, the reflective surface may provide specular reflection or, if roughened, non-specular reflection. In some embodiments, the reflective surface may be formed, for example, from shaped stamped steel, alumina, or metalized plastics.

Figure 6:
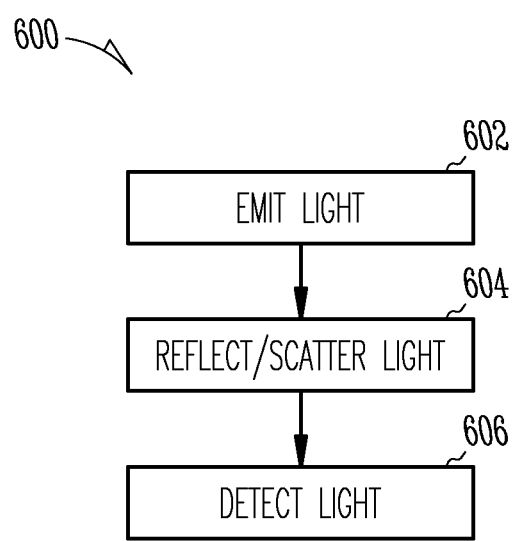
FIG. 6 shows a flow chart of an example of a method for measuring a concentration of a gas in a gas sample, in accordance with some embodiments.

FIG. 6 shows a flow chart of an example of a method 600 for measuring a concentration of a gas in a gas sample, in accordance with some embodiments. The gas can have an absorption peak at a first wavelength. The method can be executed on any of the gas sensing systems discussed herein, or on other suitable gas sensing systems.

At operation 602, the method 600 can include emitting light having a spectrum that includes the first wavelength.

At operation 604, the method 600 can include reflecting and/or scattering at least some of the light from multiple surfaces of a porous scattering material within, as well as a reflective surface of, the gas chamber. The porous scattering material contains the gas to be detected. The reflective surface is concave and has a shape that is at least a portion of a quadric surface.

At operation 606, the method 600 can include detecting at least some of the light that passed through the porous scattering material. At least one processor is able to determine a concentration of the gas from an intensity of the light detected at the sensor.

Note that various embodiment as described herein may include logic or a number of components, modules, or mechanisms such as those shown in FIG. 1, to calibrate and/or determine the gas concentrations and/or operate the emitter 102 and sensor 106. Modules and components are tangible entities (e.g., hardware) capable of performing specified operations and may be configured or arranged in a certain manner. In an example, circuits such as those shown in FIG. 1 may be arranged (e.g., internally or with respect to external entities such as other circuits) in a specified manner as a module. In an example, the whole or part of one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The processor 108 may contain and/or be coupled with a memory that contains any or all of removable storage and non-removable storage, volatile memory or non-volatile memory. The overall system may further include a display unit such as a video display, an alphanumeric input device (e.g., a keyboard), and/or a user interface (UI) navigation device (e.g., a mouse), as well as an output communication a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The memory may include a non-transitory machine readable medium (hereinafter simply referred to as machine readable medium) on which is stored one or more sets of data structures or instructions (e.g., software) embodying or utilized by any one or more of the techniques or functions described herein. The instructions may also reside, completely or at least partially, within the memory, during execution thereof by the processor 108. The term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the processor 108 and that cause the processor 108 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. The instructions may further be transmitted or received over a communications network using a transmission medium.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

EXAMPLES

Example 1 is a gas sensing system configured to measure a concentration of a gas sample introduced therein, the gas sample having an absorption peak at a first wavelength, the gas sensing system comprising: an emitter configured to emit light having a spectrum that includes, at least the first wavelength of the gas sample; a sensor configured to detect at least some of the light emitted by the emitter; a porous scattering material that is substantially transparent to the emitted light at the first wavelength, the porous scattering material configured to scatter at least some of the emitted light; and a medium disposed between the emitter and the porous scattering material and between the sensor and the porous scattering material, the emitter and the sensor laterally and vertically separated by a separator having different optical properties than the medium, the separator configured to direct light from the emitter to the porous scattering material.

In Example 2, the subject matter of Example 1 includes, wherein at least a portion of a surface of the separator disposed between the emitter and the sensor is reflective to the light of the first wavelength.

In Example 3, the subject matter of Examples 1-2 includes, wherein at least a portion of a surface of the separator disposed between the emitter and the sensor is coated with a reflective coating that is reflective to the light of the first wavelength.

In Example 4, the subject matter of Examples 1-3 includes, wherein at least a portion of a surface of the separator disposed between the emitter and the sensor is textured to scatter the light of the first wavelength.

In Example 5, the subject matter of Examples 1~4 includes, wherein at least a portion of a surface of the separator disposed between the emitter and the sensor is coated with a textured coating that is configured to scatter the light of the first wavelength.

In Example 6, the subject matter of Examples 1-5 includes, wherein: a surface of the porous scattering material facing the emitter and the sensor is substantially planar, and the separator terminates at the surface of the porous scattering material.

In Example 7, the subject matter of Examples 1-6 includes, wherein: a surface of the porous scattering material facing the emitter and the sensor comprises a depression, and the separator extends into the depression.

In Example 8, the subject matter of Example 7 includes, wherein at least a portion of a surface of the separator disposed between the emitter and the sensor is coated with a reflective coating that is reflective to the light of the first wavelength.

In Example 9, the subject matter of Example 8 includes, wherein at least a portion of a surface of the medium on an edge of the medium is coated with the reflective coating.

In Example 10, the subject matter of Examples 8-9 includes, wherein the porous scattering material is chamfered such that corners of the porous scattering material distal from the emitter and the sensor are truncated to form angled faces.

In Example 11, the subject matter of Examples 1-10 includes, wherein the porous scattering material is permeable to the gas sample.

In Example 12, the subject matter of Examples 1-11 includes, wherein: the porous scattering material is non-permeable to the gas sample, and at least one face of the porous scattering material is diffusively reflective to the light of the first wavelength.

In Example 13, the subject matter of Examples 1-12 includes, wherein: the porous scattering material is non-permeable to the gas sample, and at least one face of the porous scattering material is specularly reflective to the light of the first wavelength.

In Example 14, the subject matter of Examples 1-13 includes, wherein at least one of the emitter and the sensor is angled with respect to the medium such that a surface of the at least one of the emitter and the sensor is non-parallel with respect to a surface of the medium opposing the at least one of the emitter and the sensor.

Example 15 is a gas sensing system configured to measure a concentration of a gas sample introduced therein, the gas sample having an absorption peak at a first wavelength, the gas sensing system comprising: an emitter configured to emit light having a spectrum that includes, at least the first wavelength of the gas sample; a sensor configured to detect at least some of the light emitted by the emitter; a porous scattering material that is substantially transparent to the emitted light at the first wavelength, the porous scattering material configured to scatter at least some of the emitted light, a surface of the porous scattering material opposing the emitter and the sensor comprising a depression; and a medium disposed between the emitter and the porous scattering material and between the sensor and the porous scattering material, the emitter and the sensor laterally and vertically separated by a separator having different optical properties than the medium, the separator extending into the depression and configured to direct light from the emitter to the porous scattering material using at least one of specular and diffusive reflection.

In Example 16, the subject matter of Example 15 includes, wherein at least a portion of a surface of the separator disposed between the emitter and the sensor is coated with a reflective coating that provides the at least one of specular and diffusive reflection.

In Example 17, the subject matter of Examples 15-16 includes, wherein at least a portion of a surface of the medium on an edge of the medium is coated with a reflective coating that provides the at least one of specular and diffusive reflection.

In Example 18, the subject matter of Examples 15-17 includes, wherein the porous scattering material is chamfered such that corners of the porous scattering material distal from the emitter and the sensor are truncated to form angled faces.

Example 19 is a method for assembling a gas sensor module, the method comprising: shaping a porous scattering material substantially transparent to light having Middle Wavelength Infrared (MWIR) wavelengths to have a substantially rectangularly shaped volume with a depression in one surface; overmolding the porous scattering material with an overmold having at least one of specular and diffusive reflection to the light at the MWIR wavelengths, the overmold having a separator filling the depression and having openings on either side of the separator and an open face for reception of a gas sample to be at least partially absorbed by the light at the MWIR wavelengths; and attaching an emitter and detector to the overmold such that the emitter and detector are inserted into the openings, the emitter configured to emit light of at least the MWIR wavelengths and the sensor configured to detect at least some of the light emitted by the emitter.

In Example 20, the subject matter of Example 19 includes, providing a reflective coating on the separator to provide the at least one of specular and diffusive reflection.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

While exemplary embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

What is claimed is:

1. A gas sensing system configured to measure a concentration of a gas sample introduced therein, the gas sample having an absorption peak at a first wavelength, the gas sensing system comprising:
    an emitter configured to emit light having a spectrum that includes at least the first wavelength of the gas sample;
    a sensor configured to detect at least some of the light emitted by the emitter;
    a porous scattering material that is substantially transparent to the emitted light at the first wavelength, the porous scattering material configured to scatter at least some of the emitted light; and
    a medium disposed between the emitter and the porous scattering material and between the sensor and the porous scattering material, the emitter and the sensor laterally and vertically separated by a separator having different optical properties than the medium, the separator configured to direct light from the emitter to the porous scattering material.

2. The gas sensing system of claim 1, wherein at least a portion of a surface of the separator disposed between the emitter and the sensor is reflective to the light of the first wavelength.

3. The gas sensing system of claim 1, wherein at least a portion of a surface of the separator disposed between the emitter and the sensor is coated with a reflective coating that is reflective to the light of the first wavelength.

4. The gas sensing system of claim 1, wherein at least a portion of a surface of the separator disposed between the emitter and the sensor is textured to scatter the light of the first wavelength.

5. The gas sensing system of claim 1, wherein at least a portion of a surface of the separator disposed between the emitter and the sensor is coated with a textured coating that is configured to scatter the light of the first wavelength.

6. The gas sensing system of claim 1, wherein:
    a surface of the porous scattering material facing the emitter and the sensor is substantially planar, and
    the separator terminates at the surface of the porous scattering material.

7. The gas sensing system of claim 1, wherein:
    a surface of the porous scattering material facing the emitter and the sensor comprises a depression, and
    the separator extends at least partially into the depression.

8. The gas sensing system of claim 7, wherein at least a portion of a surface of the separator disposed between the emitter and the sensor is coated with a reflective coating that is reflective to the light of the first wavelength.

9. The gas sensing system of claim 8, wherein at least a portion of a surface of the medium on an edge of the medium is coated with the reflective coating.

10. The gas sensing system of claim 8, wherein the porous scattering material is chamfered such that corners of the porous scattering material distal from the emitter and the sensor are truncated to form angled faces.

11. The gas sensing system of claim 1, wherein the porous scattering material is permeable to the gas sample.

12. The gas sensing system of claim 1, wherein:
the porous scattering material is non-permeable to the gas sample, and
at least one face of the porous scattering material is diffusively reflective to the light of the first wavelength.

13. The gas sensing system of claim 1, wherein:
the porous scattering material is non-permeable to the gas sample, and
at least one face of the porous scattering material is specularly reflective to the light of the first wavelength.

14. The gas sensing system of claim 1, wherein at least one of the emitter and the sensor is angled with respect to the medium such that a surface of the at least one of the emitter and the sensor is non-parallel with respect to a surface of the medium opposing the at least one of the emitter and the sensor.

15. A gas sensing system configured to measure a concentration of a gas sample introduced therein, the gas sample having an absorption peak at a first wavelength, the gas sensing system comprising:
an emitter configured to emit light having a spectrum that includes at least the first wavelength of the gas sample;
a sensor configured to detect at least some of the light emitted by the emitter;
a porous scattering material that is substantially transparent to the emitted light at the first wavelength, the porous scattering material configured to scatter at least some of the emitted light, a surface of the porous scattering material opposing the emitter and the sensor comprising a depression; and
a medium disposed between the emitter and the porous scattering material and between the sensor and the porous scattering material, the emitter and the sensor laterally and vertically separated by a separator having different optical properties than the medium, the separator extending into the depression and configured to direct light from the emitter to the porous scattering material using at least one of specular and diffusive reflection.

16. The gas sensing system of claim 15, wherein at least a portion of a surface of the separator disposed between the emitter and the sensor is coated with a reflective coating that provides the at least one of specular and diffusive reflection.

17. The gas sensing system of claim 15, wherein at least a portion of a surface of the medium on an edge of the medium is coated with a reflective coating that provides the at least one of specular and diffusive reflection.

18. The gas sensing system of claim 15, wherein the porous scattering material is chamfered such that corners of the porous scattering material distal from the emitter and the sensor are truncated to form angled faces.

19. A method for assembling a gas sensor module, the method comprising:
shaping a porous scattering material substantially transparent to light having Middle Wavelength Infrared (MWIR) wavelengths to have a substantially rectangularly shaped volume with a depression in one surface;
overmolding the porous scattering material with an overmold having at least one of specular and diffusive reflection to the light at the MWIR wavelengths, the overmold having a separator filling the depression and having openings on either side of the separator and an open face for reception of a gas sample to be at least partially absorbed by the light at the MWIR wavelengths; and
attaching an emitter and detector to the overmold such that the emitter and detector are inserted into the openings, the emitter configured to emit light of at least the MWIR wavelengths and the sensor configured to detect at least some of the light emitted by the emitter.

20. The method of claim 19, further comprising providing a reflective coating on the separator to provide the at least one of specular and diffusive reflection.

* * * * *